Sept. 30, 1941.      A. G. RINDFLEISCH            2,257,126
                         PROPELLER
                   Filed Jan. 27, 1936          5 Sheets-Sheet 2

INVENTOR.
ARTHUR G. RINDFLEISCH.
BY
H.C. Kavel.
ATTORNEY.

Sept. 30, 1941.  A. G. RINDFLEISCH  2,257,126
PROPELLER
Filed Jan. 27, 1936  5 Sheets-Sheet 3

INVENTOR.
ARTHUR G. RINDFLEISCH.
BY
W.C. Karel.
ATTORNEY.

Sept. 30, 1941.  A. G. RINDFLEISCH  2,257,126
PROPELLER
Filed Jan. 27, 1936  5 Sheets-Sheet 4
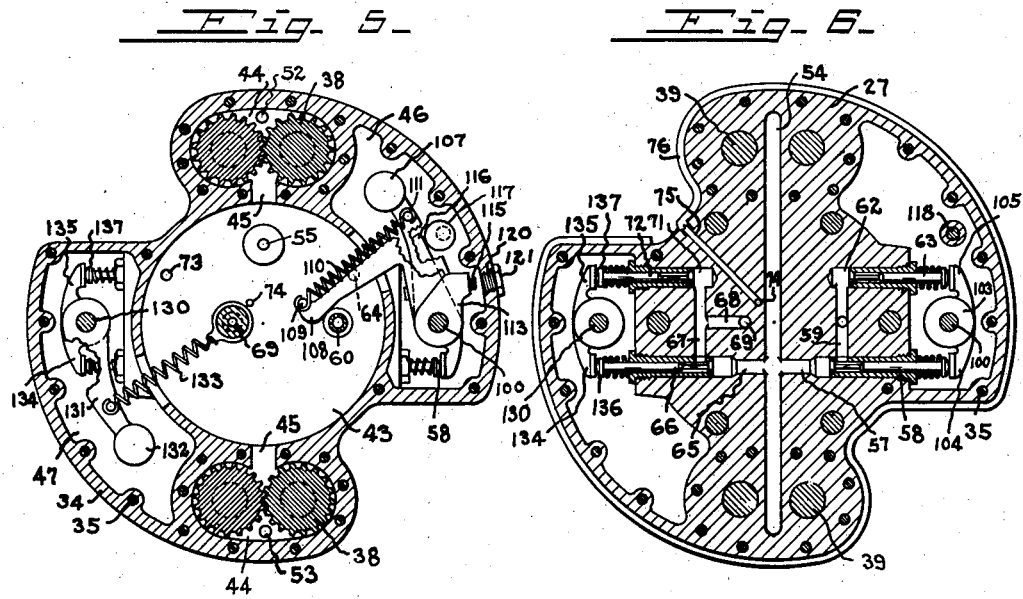
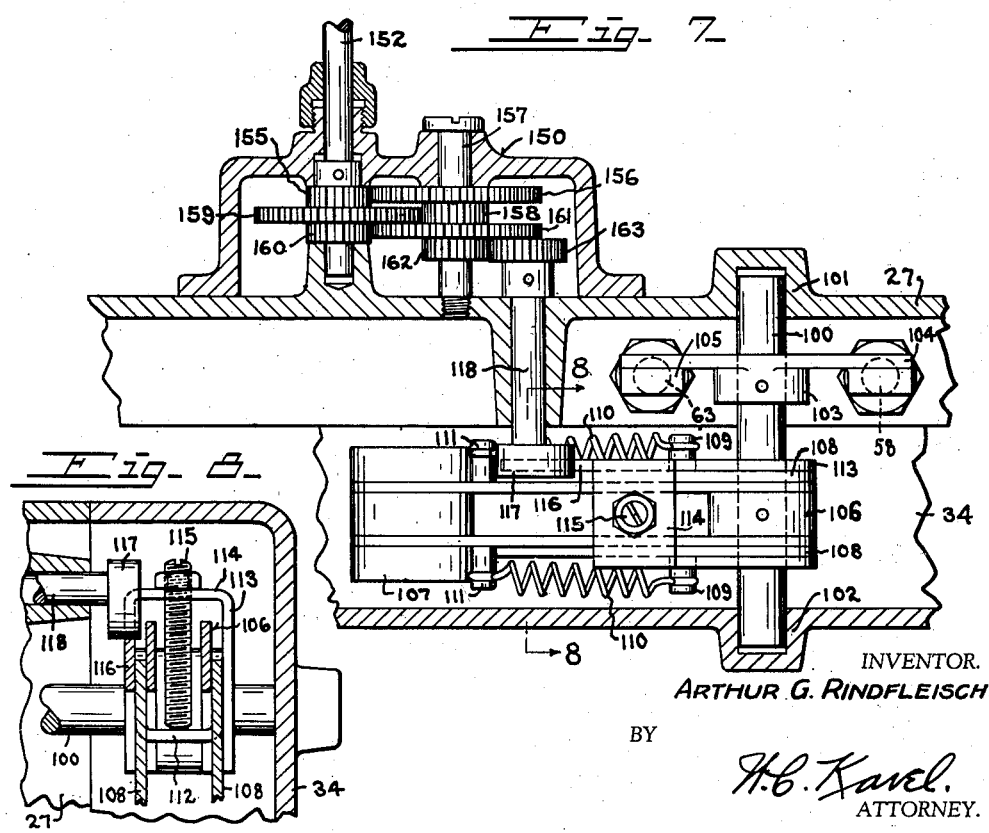
INVENTOR.
ARTHUR G. RINDFLEISCH.
BY
H. C. Kavel.
ATTORNEY.

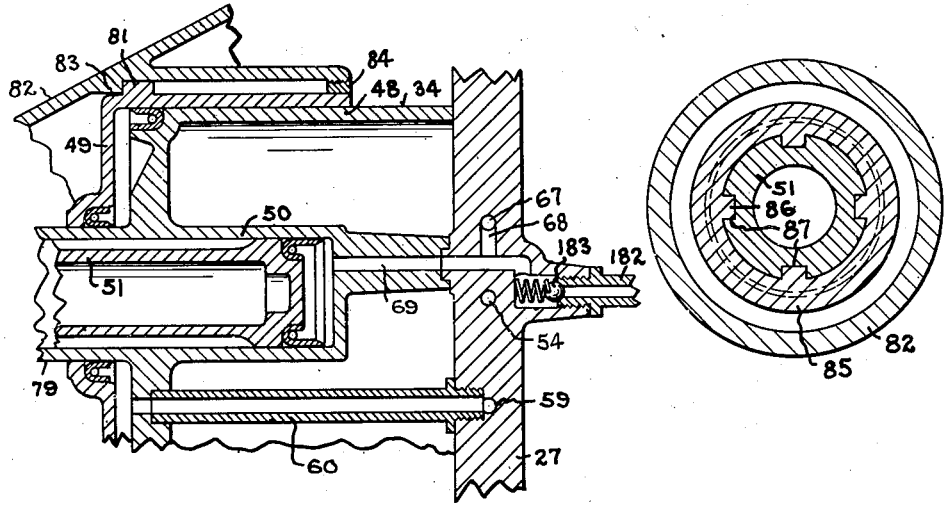
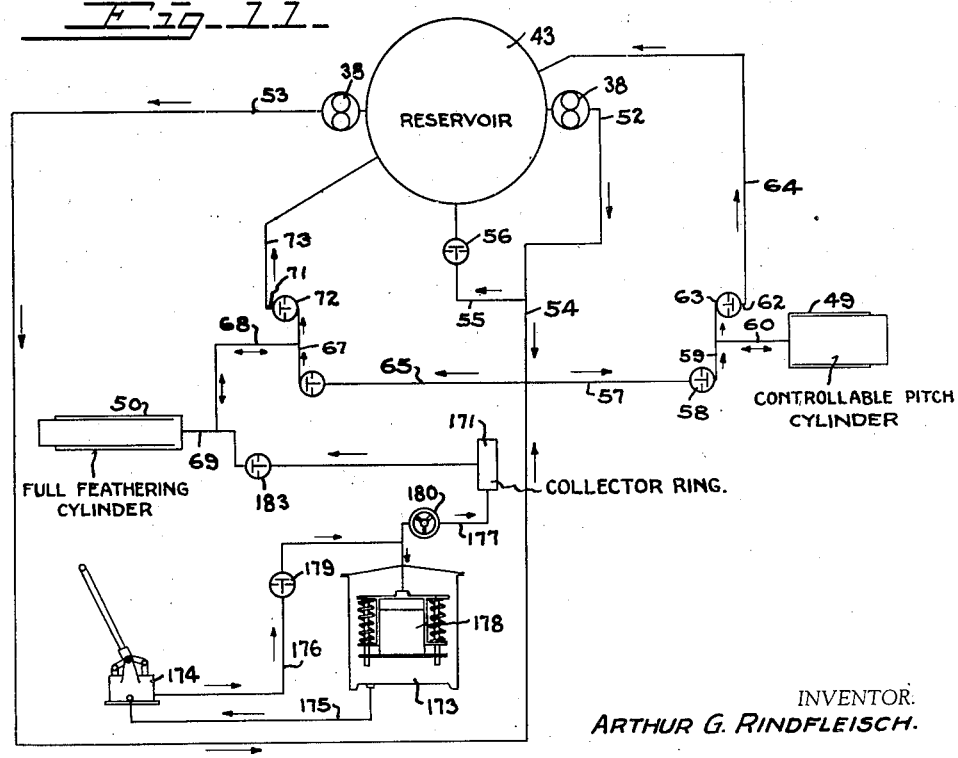

Patented Sept. 30, 1941

2,257,126

UNITED STATES PATENT OFFICE 2,257,126

PROPELLER

Arthur G. Rindfleisch, Cincinnati, Ohio, assignor to Bocjl Corporation, trustee, Pittsburgh, Pa., a corporation of Delaware Application January 27, 1936, Serial No. 60,949

32 Claims. (Cl. 170—163)

My invention relates to an aircraft propeller and more particularly to one with an automatic selective pitch, that is, one which automatically adjusts itself to the proper pitch relative to the R. P. M. of the propeller and the horsepower of the motor, to maintain the propeller at a constant rotative speed.

In the operation of aircraft, it is well recognized that a variable or controllable pitch propeller, which pitch can be controlled while the aircraft is in a state of flight, will give a superior performance over a constant pitch propeller. Broadly speaking the reason for this, is that, if the pitch of the propeller is set at such an angle which will give the most economical engine performance at cruising speed (as in the case of a constant pitch propeller), then the pitch of this same propeller will not give the most satisfactory results when the aircraft is taking off, or when in a climb, or other maneuvers. This is due to the fact that the engine will not be capable of turning the propeller at its maximum R. P. M. or produce the maximum engine horsepower.

However, if the pitch of the propeller is capable of being decreased or increased sufficiently during the operation of the aircraft, it will allow the engine to deliver its full rated horsepower and propeller speed under all maneuvers, including the take-off or when in a climb. Therefore the angle of attack of the aircraft can be increased at the time of take-off or when in a climb and as a result of this permit the aircraft to take-off in a shorter run or with an increased load.

In order to meet these conditions, it is obvious that the pitch of the propeller should be variable and controllable relative to the rated horsepower of the engine and the R. P. M. of the propeller, and it is also desirable that the pitch be automatically controlled by the R. P. M. of the propeller as well as being capable of control by the pilot.

Therefore in my improved construction I have incorporated means for automatically increasing or decreasing the pitch of the propeller controlled by the R. P. M. of the propeller, as well as means for manual control and means for automatically and manually changing the pitch of the propeller to a full feathering position, in which position the propeller will offer the least resistance to the air and eliminate the windmill effect, due to the blades entering the airstream edgewise instead of broadside, when the engine is dead or the throttle is closed, giving a smoother flow of air over that section of the wing within the zone of the dead propeller, resulting in a higher lift. This is especially significant in the case of multi-motored ships in the event that a motor is cut out due to mechanical or other reasons.

The primary object of my invention is to provide a propeller construction which is variable and automatically controllable by a governing mechanism which is regulated by the rotative speed of the propeller during the various maneuvers of the aircraft, or by an increase or decrease in the engine power, or both.

A further object is to provide an isolated independent fluid pressure and control system for operating automatically the pitch changes of the propeller.

A further object is to provide automatic means for full feathering the propeller.

A further object is to provide emergency means controlled by the pilot for full feathering the propeller.

A further object is to provide manual control means for changing the pitch of the propeller.

A further object is to provide novel means for attaching and supporting the propeller blades on the hub.

My invention will be further readily understood from the following description and claims, and from the drawings, in which latter:

Fig. 5 is a cross-section of the same, taken in the plane of the line 5—5 of Fig. 2.

Fig. 6 is a cross-section of the same, taken in the plane of the line 6—6 of Fig. 2.

Fig. 7 is a detail section of the governor mechanism and manual control therefor, taken in the plane of the line 7—7 of Fig. 4.

Fig. 8 is a detail, taken in the plane of the line 8—8 of Fig. 7.

Fig. 9 is a detail section, taken in the plane of the line 9—9 of Fig. 2.

Fig. 10 is a detail section, taken on the line 10—10 of Fig. 2, and;

Fig. 11 is a diagrammatic view of the fluid system.

Figure 1:
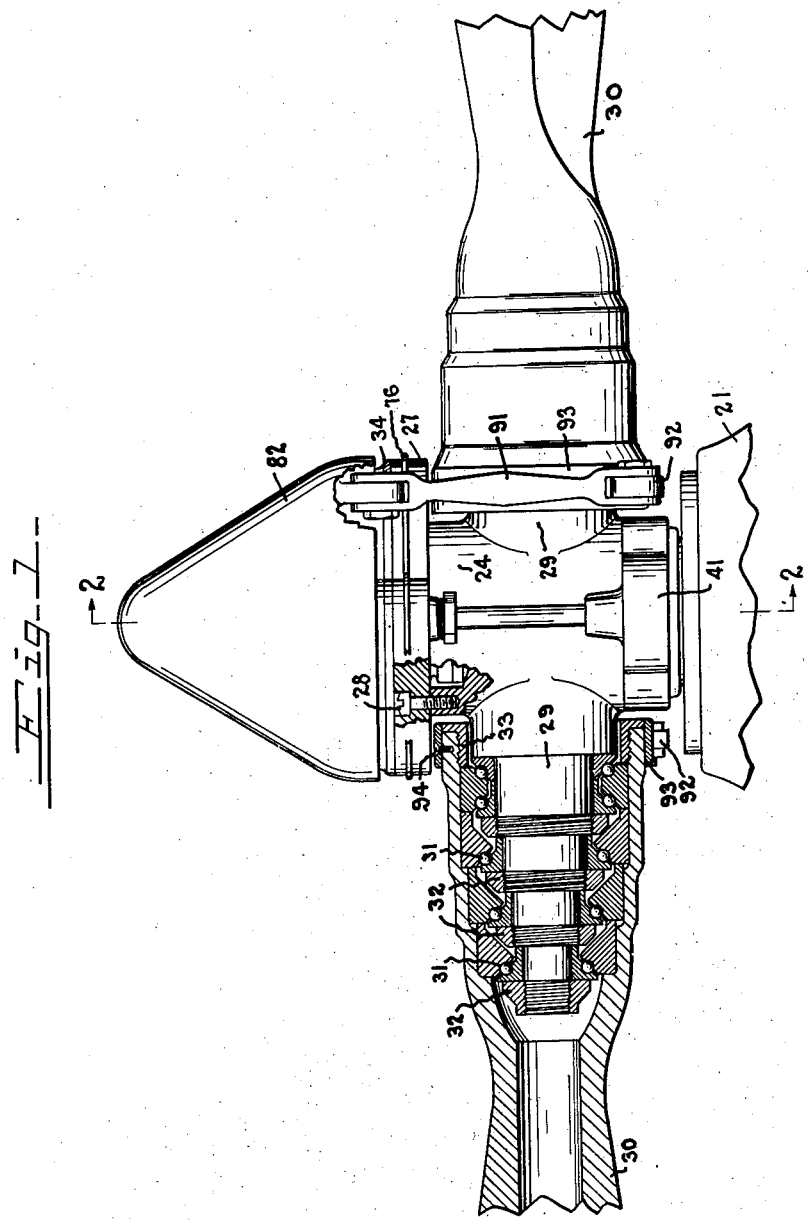
Fig. 1 is a plan view of the propeller head, with one of the blade mountings in section.

In the particular embodiment of the invention illustrated, the propeller blades which are adjustable over a range between a low pitch and a high pitch position and also to a full feathered position, are adjusted in the automatic operation thereof by two expansible chamber fluid pressure motors, one motor adjusting the blades in the range between low and high pitch positions; the second moving the blades to the full feathered position. Fluid pressure is supplied from a fluid circulating system with pumping means therein.

In the drawings I have shown my improved propeller construction mounted on a standard aircraft motor, in which the crankcase is indicated at 21, having the usual bearing 22 for the propeller drive shaft 23. A hub structure 24 is keyed to the shaft 23 as at 25 and clamped thereon as by a threaded connection 26 with a plate 27. The plate is also suitably bolted to the hub as by bolts 28.

Extending outwardly from the hub 24 are stud shafts 29, on which the propeller blades 30 are rotatably mounted, having ball bearings 31 individually held on the shaft by nuts 32. The inner or root end of the blade is internally threaded to receive a nut 33 which clamps the outer raceways of the ball bearings 31 in the propeller blade. Thus the ball bearings absorb the thrust, centrifugal and torque loads of the propellers when in a state of rotation, and such loads are equally carried by the raceways of each of the bearings. In the present instance I have shown four such bearings and each bearing will carry one-fourth of the load.

While I have shown two propeller blades in the drawings, it is apparent that the same structure can be employed in a propeller construction having more than two blades.

Secured to the forward face of the plate 27 is a housing 34 forming a reservoir for the fluid used to operate the mechanism for changing the pitch of the propeller and also forms a guide for the cylinder and piston hereinafter described. This housing 34 is suitably bolted to the plate as by bolts 35.

Secured to the crankcase is a gear 36. Planetary gears 37 rotate with the hub structure around the gear 36 and impart rotation to the gear pumps 38 through the shafts 39, which are journaled in bearings 40 in a gear housing 41 attached to the hub structure and bearings 42 in the plate 27.

The housing 34 forms a central reservoir 43, with gear pump chambers 44 having connecting ports 45 with the reservoir. The housing is also provided with cavities 46 and 47 for the governor mechanism having connection with and forming part of the fluid reservoir. The housing extends outwardly forming a guide or fixed piston 48 for the cylinder 49 constituting the movable element of the expansible chamber motor which varies the pitch of the blades, and a cylinder 50 for the piston 51, which is the movable part of the expansible chamber motor through which full feathering of the blades is accomplished.

Ports 52 and 53 in the plate 27 connect with a transverse passage 54. A relief port 55 connects with the passage 54 and has a check valve 56 therein. The setting of this check valve governs the pressure in the passages. A passage 57 having connection with the passage 54, has the governor actuated valve 58 therein, for opening or closing said passage to a cross passage 59, and connecting with the tube 60 which forms a passage to the automatic pitch changing cylinder 49. The passage 59 also connects with a passage 62 having a governor actuated valve 63 therein, for opening and closing said passage 62 for connection with a return port 64 which connects with the reservoir 43. A passage 65 having connection with the passage 54, has the full feathering governor controlled valve 66 therein, for opening or closing said passage to a cross passage 67. A passage 68 connects the passage 67 with a passage 69 leading to the full feathering cylinder 50. The fluid in returning to the reservoir passes from the cylinder 50 through the passage 69, passage 68, passage 67, through passage 71 which has a governor actuated valve 72 therein, for opening and closing said passage to the return port 73 leading to the reservoir. A breather port 74 has a passage 75 through the plate to which a tube 76 connects and encircles the plate.

The automatic pitch cylinder 49 encompasses the reservoir housing and has a bearing on the outer periphery 79 of the full feathering cylinder 50, which is concentric with the reservoir and integral therewith. The cylinder 49 is provided with a collar 81 arranged to limit the endwise movement of the nose housing 82, which is provided with engaging peripheral stops 83 and 84. A collar 85 is threaded to the end of the cylinder 50 and pinned thereto. This collar has splines 86 engaging splineways 87 in the piston 51. The nose housing 82 is threaded to the piston 51 with reverse threads whereby the rotative force will tend to tighten the threaded connection. The collar 85 also acts as a stop for the forward movement of the cylinder 49. Thus the nose and its component parts are held against independent rotation from the entire propeller structure.

The rearward inner face of the nose is provided with lugs 90 to which connecting links 91 are pivotally secured, with the other end of the links pivoted to extensions 92 on the ring 93 keyed to the propeller blades 30 and further held thereon by screws 94.

In the operation of aircraft it is desirable to change the pitch of the propeller blades to compensate for varying conditions while in flight as well as in taking off and landing. I accomplish this change in pitch automatically by means of a governor mechanism controlled by the R. P. M. of the propeller. The governor mechanism is received in the cavity 46 and comprises a shaft 100 supported in bearings 101 and 102 in the plate and housing respectively. A collar 103 is fixed on the shaft and has extending arms 104 and 105 engaging the stems of valves 58 and 63. The governor 106 is fixed to the shaft and comprises a pair of spaced apart arms having a weight or ball 107 secured to the extending ends. A pair of arms 108 are pivoted on the governor shaft and have extending pins 109 at their free ends to which springs 110 are secured, with the other ends of the springs secured to pins 111 on the governor arms 106. A cross-bar 112 connects the pair of arms 108. A yoke 113 is also pivoted to the governor shaft 100 and has a cross-bar 114 through which a screw 115 is threaded and contacts the cross-bar 112 for adjusting the space between the respective arms for increasing or decreasing the tension on the springs 110. The yoke 113 has an extending arm 116 arranged to be engaged by a cam 117 mounted on a shaft 118, which has a bearing in the plate 27. Rotation of this cam will increase or decrease the tension on the springs 110 for manually setting the governor mechanism to a different effective position relative to the R. P. M. of the propeller. The means for operating the cam will be hereinafter more fully described, but the cam at all times acts as a stop for the tension adjusting means.

Assuming the predetermined R. P. M. of the propeller is 2000 at full throttle in sustained horizontal flight, and the rotative speed of the crankshaft is reduced due to an increase of load, as when going into a climb, the governor arm will be drawn inwardly by the springs 110 due to the reduced centrifugal force on the weight 107. This inward movement of the governor will cause the arm 105 to open the valve 63 permitting the fluid in the cylinder 49 to pass through the tube 60 to the cross-passage 59, through the valve 63 to the opening 64 and into the reservoir. It is to be understood that the reservoir is filled with suitable oil at the time of assembly, or can be filled through the opening 120 which is normally closed by the cap screw 121. In order to fill the reservoir, the screw is removed and the fluid is injected under pressure preferably with an "Alemite gun" into the governor housing, thence into the main reservoir and into the opposite governor housing. When all the compartments and leads are completely filled the excess or overflow will be forced out the breather tube 76. The nut is then replaced with the assurance of having the reservoir completely filled. Thus forming an independent or isolated fluid system for the operation of the pitch changing mechanism.

The fluid is forced out of the cylinder 49 by the propeller blades drawing the nose inwardly due to the centrifugal force exerted on the rotating blades, which causes the blades to seek their lowest pitch angle, thus decreasing the pitch of the blades until such time as the load is reduced to permit the propeller to rotate at its predetermined R. P. M. As soon as this occurs the governor weight will again move outwardly to a position whereby both valves 58 and 63 are closed. Thus maintaining the propeller in this changed pitch position until the load on the drive shaft is changed by a change of maneuver.

However, if the rotative speed of the propeller is increased, as in a dive or leveling off after a climb, the load on the drive shaft will be decreased and the weight on the governor will move outwardly due to the increased centrifugal force exerted thereon, causing the valve 58 to open permitting the fluid under pressure to pass from the pumps through the passageway 54 to 57, through the valve 58 into the passageway 59, through the tube 60 into the cylinder 49 causing the cylinder to move outwardly carrying the nose therewith. As the nose moves forward the links 91 also move forward turning the propeller blades on the hub for increasing the pitch angle of the blades until the load reduces the rotative speed of the propeller to the basic R. P. M. at which time the weight will again assume its balanced position with both valves closed.

In the opposite cavity 47, the full feathering governor mechanism is mounted. This governor mechanism is set to operate at a low R. P. M. for example 500 R. P. M. and comprises a shaft 130 suitably journalled in the housing and plate. A governor arm 131 is fixed to the shaft and has a weight or ball 132 on its extending end. A spring 133 is attached to the governor arm and to a fixed part of the housing for drawing the governor inwardly beyond its neutral position, when the rotative speed of the propeller is reduced below the set R. P. M., in this case 500 R. P. M. A pair of arms 134 and 135 fixed to the shaft engage valve stems 136 and 137 of the full feathering valves 66 and 72.

Figure 2:
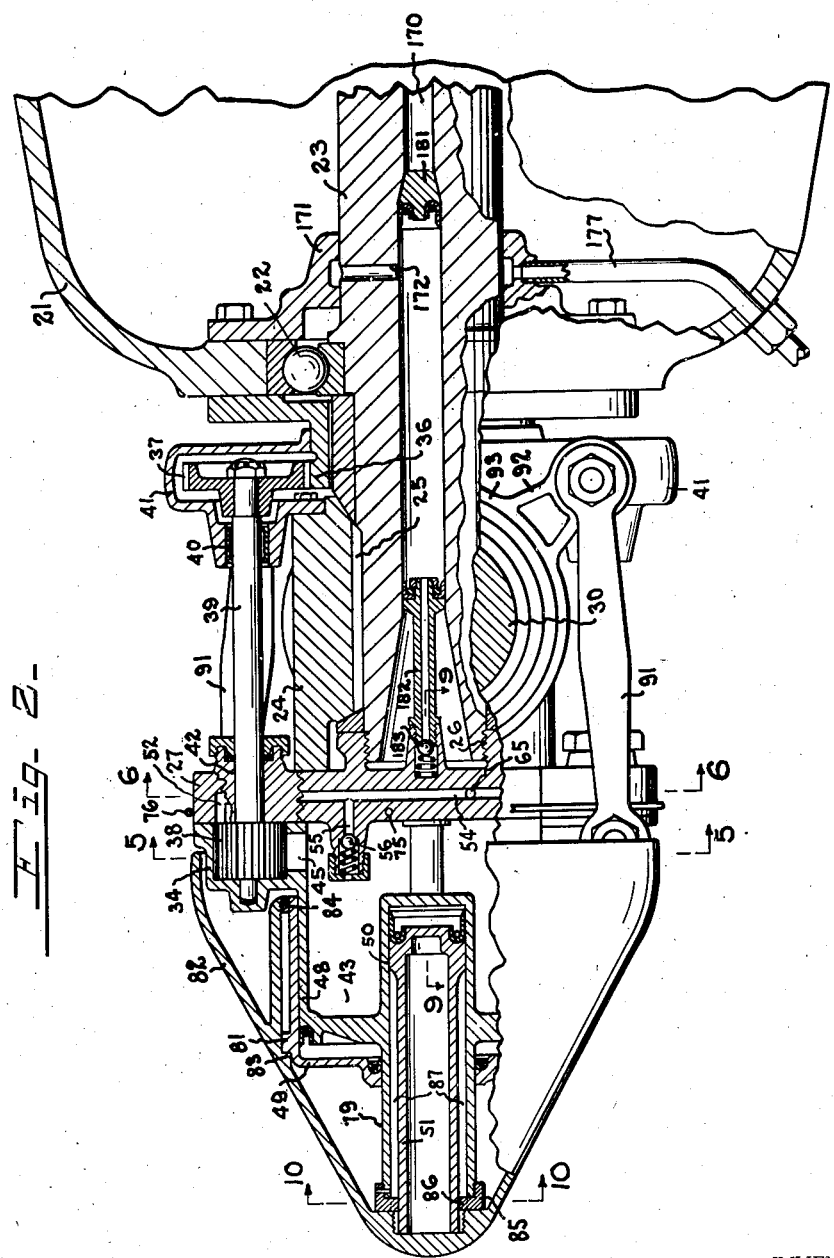
Fig. 2 is a longitudinal section of the same, taken in the plane of the line 2—2 of Fig. 1.

During flight and when the propeller is turning over at a rate above 500 R. P. M. the governor arm is maintained in an outward position due to the centrifugal force and the valve 72 is open, thus forming an unobstructed passage between the full feathering cylinder and the reservoir. The full feathering piston moves with the controllable pitch cylinder in its cycle of operation, and this vent to the reservoir permits free movement of the full feathering piston. When the propeller slows down below 500 R. P. M. the governor will open the valve 66 and close the valve 72, thus fluid under pressure will be forced from the pumps through the passages 53 and 54, through passage 65 past the valve 66 through passages 67, 68 and 69 into the cylinder 50, moving the piston 51 outwardly. At this time the parts are in the position shown in Figure 2. As fluid under pressure is pumped into cylinder 50, piston 51 is moved to the left as viewed in this figure, moving the nose in a corresponding direction. Cylinder 49 will remain stationary until collar 84 engages projection 81, when this cylinder will be pulled to the left along with the nose. When the central part of the cylinder 49 guided on the cylinder 50 contacts the collar 85, further travel of the nose in this direction will be limited. As the nose 82 moved forward the links 91 rotated the propeller blades to a full feathering position, being an edgewise position relative to the airstream, thus reducing the head resistance of a dead propeller as well as eliminating the windmill effect, when the motor is dead. The arrangement described allows the nose to move much further under the action of the piston 51 than under the influence of cylinder 49, a lost motion arrangement being provided in that the cylinder 49 travels with the piston 51 through only the latter portion of the travel of said piston.

When the propeller is in a state of rotation a centrifugal force will occur in the rotating blades, and as a result every particle of mass within the blades will try to position themselves as far away from the center of rotation as possible. As a result of this a strong turning force is created which tends to rotate the blades about their longitudinal axes toward the low pitch position. As the propeller rotates above 500 R. P. M. the valve 66 will close and the valve 71 will open, providing a free passage from the cylinder to the reservoir through the passages 69, 68, 67, 71 and as valve 72 is open, through port 73 into the reservoir. The rotative force exerted on the blades will cause the blades to seek their lowest pitch position, as they are free to rotate about their hubs, and the fluid in the cylinder 50 will be forced back into the reservoir. Also the fluid in the cylinder 49 will be forced into the reservoir as the valve 63 is open until the propeller has reached sufficient speed to cause the governor 106 to move outwardly to close the valve.

Figure 3:
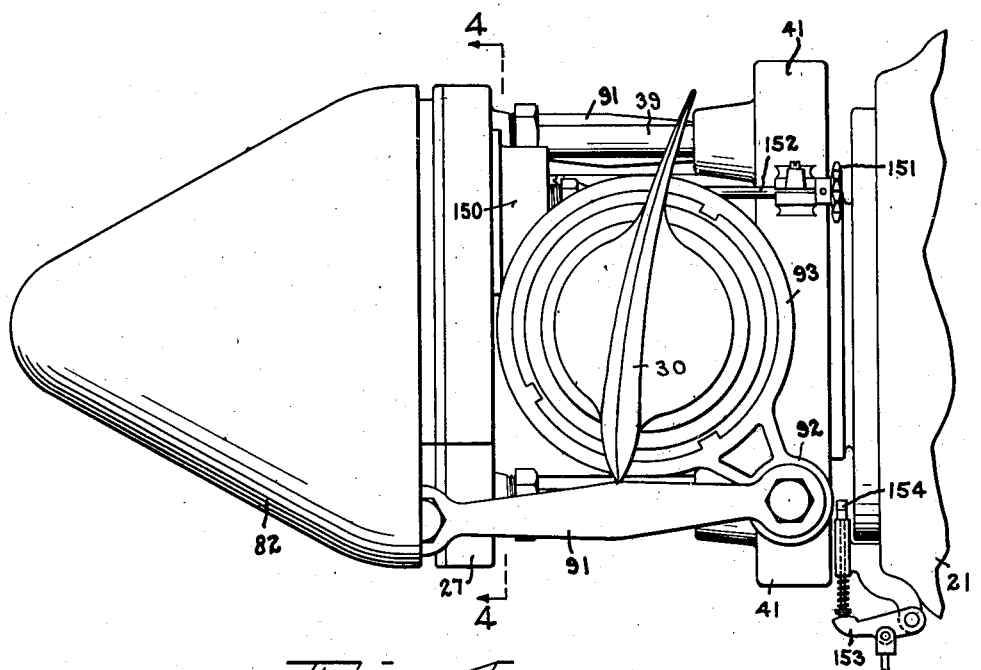
Fig. 3 is a side view of the propeller head.
Figure 4:
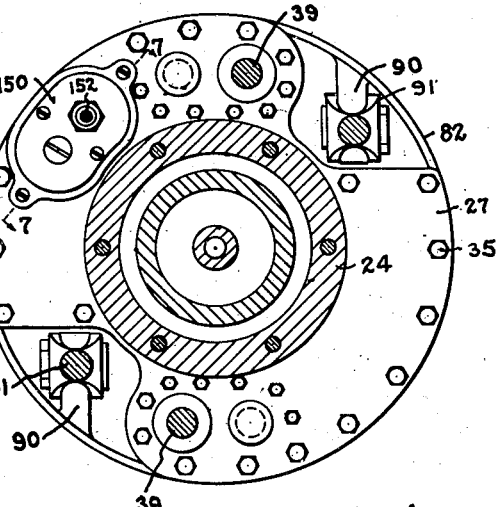
Fig. 4 is a cross-section of the same, taken in the plane of the line 4—4 of Fig. 3.

I have also provided means for manually controlling the controllable pitch governor mechanism through rotation of the cam 117 for increasing or decreasing the tension on the springs 110. The means employed comprises a speed reducing unit 150 (see Figs. 3, 7 and 8). A star wheel 151 is fixed to a shaft 152 supported in suitable bearings and rotating with the propeller mounting about the axis of the drive shaft. Located within the reach of the pilot is a "Bowden wire" control similar to an ordinary choke button, and this wire connects to an arm 153 pivoted to the motor housing. An actuating pin 154 is mounted in a support on the motor housing, and upon pushing in on the arm 153 places the pin in the path of the star wheel, whereby upon each revolution of the propeller a partial revolution of the shaft 152 takes place. The speed reducing unit 150 comprises a gear 155 fixed to the shaft 152 and meshes with a gear 156 on a stud shaft 157. The gear 156 has a gear 158 fixed thereto which meshes with an idler gear 159, having a gear 160 fixed thereto, for transmitting motion to idler gear 161 having gear 162 attached thereto for imparting rotation to gear 163 fixed to the cam shaft 118 for slowly rotating the cam 117.

Therefore, once the tachometer reading is known for a given pitch angle of the propeller (which is established by the basic adjustment of the screw 115) at a given throttle position, then it is only necessary for the pilot to observe the decrease in tachometer reading when increasing the pitch for fuel economy when cruising.

Conversely to this, when resetting the governor to its normal position, the pilot must observe the increase in tachometer reading until it again attains its normal R. P. M. for the given throttle position.

In the event that an engine should go dead suddenly without previous warning, and the fluid pressure from the pumps does not continue for a sufficient length of time to allow the blades to attain their full feathered position, I provide manual means for operating the full feathering mechanism from the pilot's cockpit.

The present day production motor is provided with a drive shaft which is hollow as indicated at 170, with a collector ring 171 having a passage 172 communicating with the collector ring. Advantage is taken of this construction for the single purpose of operating the manual full feathering feature of the invention.

A simple embodiment of the manual means is shown in the diagrammatic view of Fig. 11, wherein the fluid supply is held in a tank 173 and pumped therefrom by means of a hand pump 174, through a tubular connection 175. A tubular member 176 connects the pump with a pipe 177 connecting an accumulator 178 with the collector ring 171. A check-valve 179 is in the pipe 176 and a hand controlled valve 180 is in the pipe 177. I provide a plug 181 in the hollow drive shaft, and the plate 27 is provided with an extending boss to which a tube 182 is secured having its extending end provided with means for sealing the tube to the hollow shaft. The end of the tube is provided with a check-valve 183, and having connection with the passage 69. Thus when it is desired to use the manual full feathering mechanism, the hand pump is operated to build up a supply of fluid in the accumulator, the valve 180 is opened to permit the fluid to enter the collector ring and pass to the hollow shaft through the tube 182, past the check-valve 183 into the passage 69 for creating a pressure on the full feathering piston 51 and moving it endwise to full feather the propeller blades. When the motor is again started and the propeller attains a speed above 500 R. P. M. the valves 58 and 66 will close and the valves 72 and 63 will be open. The fluid being forced out of the cylinder, as previously described under the automatic full feathering, will pass through the passage 69 being prevented from re-entering the tube 182 by the check-valve 183, will pass through the passages 68 and 67 past the valve 72 and through the port 73 into the reservoir. If the reservoir was completely full previous to the operation of the manual full feathering operation, the excess fluid will be forced out of the vent tube 76.

It will be apparent from the foregoing, that I have devised a practical and complete mechanism for controlling the pitch of the propeller to maintain a constant propeller speed under all conditions as well as providing means for full feathering the propeller when the motor is dead or its speed reduced below a set R. P. M. Means have also been provided to manually change the basic R. P. M. setting of the governor.

It is apparent that the constant speed or R. P. M. is, of course, predetermined for any particular propeller and engine combination, and the basic setting of this speed is preset at the time of installation; however, in addition to this the manual control is installed in the pilot's cockpit in order to alter this basic setting within certain limits while in flight in order to obtain the maximum fuel economy when on an extended flight.

The fact that the fluid system employed to operate the pitch changes is completely isolated from the motor is of particular importance due to the fact that an anti-freeze solution may be used without the danger of contaminating the motor lubricating oil.

Having thus fully described my invention, what I claim as new and desire to secure by Letters Patent is:

1. A propeller for aircraft adapted to have its blades held in normal low-pitch position by centrifugal force acting on the mass of the blades, an isolated fluid system, means imparted by the rotation of said propeller for creating a pressure in said fluid system, means for changing the pitch of said propeller blades operated by said fluid system and governed by the speed of said propeller, and means for full feathering said propeller blades automatically upon reduction of the rate of rotation of said propeller below a predetermined speed.

2. A propeller for aircraft adapted to have its blades held in normal low-pitch position by centrifugal force acting on the mass of the blades, an isolated fluid system, means imparted by the rotation of said propeller for creating a pressure in said fluid system, means for increasing the pitch of said propeller blades operated by said fluid system and governed by the speed of said propeller, means for full feathering said propeller blades automatically upon reduction of the rate of rotation of said propeller below a predetermined speed and means for manually full feathering said propeller blades.

3. A propeller for aircraft adapted to have its blades held in normal low-pitch position by centrifugal force acting on the mass of the blades, an isolated fluid system, means for creating a pressure in said fluid system, means for increasing the pitch of said propeller blades operated by the pressure in said fluid system and governed by the speed of said propeller, means for manually changing the effective speed for changing the pitch of said propeller blades, and means operable through said fluid system for full feathering said propeller blades automatically upon reduction of rotative speed of said propeller below a predetermined speed.

4. A propeller structure for an aircraft comprising a drive-shaft, a hub structure fixed to said drive-shaft provided with extending stud-shafts, propeller blades rotatable on said stud-shafts, a plate mounted on the forward end of said drive-shaft, a fluid reservoir housing secured to said plate, a cylinder hydraulically and slidably fitted about said reservoir the reservoir forming a fixed piston for cooperation with said cylinder, means mounted on said plate for controlling the flow of fluid to said cylinder, a nose mounted on said cylinder, links connecting said nose to said propeller blades, whereby upon movement being imparted to said cylinder said blades will be rotated on their respective stud-shafts for changing their pitch angle.

5. A propeller structure for an aircraft comprising a drive-shaft, a hub structure fixed to said drive-shaft provided with extending stud-shafts, propeller blades rotatably mounted on said stud-shafts, a housing secured to the forward end of said drive-shaft and hub, an independent fluid system wholly within said housing, means for creating a pressure in part of said system, governor mechanisms mounted within said housing actuated by the rotative speed of said propeller, a nose mounted on said housing, a pair of cylinders connecting said nose to said housing, valves in said fluid system operable by said governor mechanisms for emitting fluid under pressure to said cylinders, one of said cylinders operable for increasing the pitch of said propeller blades and the other cylinder operable for full feathering said propeller blades, and links connecting said nose to said propeller blades whereby movement of said nose will cause rotative movement of said propeller blades for changing their pitch angles.

6. A controllable pitch propeller comprising a drive-shaft, a hub on said drive-shaft provided with extending stud-shafts, propeller blades rotatably mounted on said stud-shafts, a housing secured to the forward end of said drive-shaft, an independent fluid system within said housing, means for creating a pressure in part of said system, a governor mechanism mounted in said housing actuated by the rotative speed of said propeller, a nose endwise movable on said housing, an expansion chamber motor within the nose included in the fluid system for effecting movement of the nose in a forward direction, links connecting said nose to the respective propeller blades, said governor mechanism controlling the actuation of said motor to move said nose forward and increase the pitch of said propeller blades, said blades being so arranged that centrifugal force tends to move the nose rearwardly and decrease the pitch of the blades.

7. A propeller for an aircraft having a predetermined rotative speed, an independent fluid system, means in said system to maintain said predetermined propeller speed by varying the pitch of said propeller blades, and further means operable through said fluid system for automatically full feathering said propeller blades upon reduction of rotative speed of said propeller below a predetermined speed.

8. A propeller unit for an aircraft having a predetermined rotative speed, an independent fluid system wholly within said unit, speed-responsive means in said system to maintain said predetermined propeller speed by varying the pitch of said propeller blades, and means for manually full feathering said propeller.

9. A propeller for an aircraft having a predetermined rotative speed, an independent fluid system, means in said system to maintain said predetermined propeller speed by varying the pitch of said propeller blades, further means operable through said fluid system for automatically full feathering said propeller blades upon reduction of rotative speed of said propeller below a predetermined speed, and means for manually full feathering said propeller.

10. A propeller for an aircraft having a predetermined rotative speed, an independent fluid system, means in said system to maintain said predetermined propeller speed by varying the pitch of said propeller blades, means for manually changing the predetermined rotative speed in flight, and further means operable through said fluid system for automatically full feathering said propeller upon reduction of rotative speed of said propeller below a predetermined speed.

11. A propeller for an aircraft having a predetermined rotative speed, an independent fluid system, means in said system to maintain said predetermined propeller speed by varying the pitch of said propeller blades, means for manually changing the predetermined rotative speed in flight, further means operable through said fluid system for automatically full feathering said propeller upon reduction of rotative speed of said propeller below a predetermined speed, and means for manually full feathering said propeller blades.

12. A variable pitch propeller having blades adjustable from a low pitch position to a high pitch position and also adjustable to a full feathered position, a motor for adjusting the blades in the range between the low and high pitch positions, and a second motor for adjusting the blades to the full feathered position, and a control system including speed responsive means through which operation of said motors is controlled in such manner as to normally exclude operation of the latter motor while the former is functioning.

13. A variable pitch propeller having blades adjustable from a low pitch position to a high pitch position and also adjustable to a full feathered position, an actuating mechanism for adjusting the blades in the range between the low and high pitch positions, a second actuating mechanism for adjusting the blades to the full feathered position, and speed-responsive devices for controlling both of said actuating mechanisms.

14. A variable pitch propeller having blades adjustable from a low pitch position to a high pitch position and also adjustable to a full feathered position, an actuating mechanism for adjusting the blades in the range between the low and high pitch positions, a second actuating mechanism for adjusting the blades to the full feathered position, speed-responsive devices for controlling both of said actuating mechanisms, and manually operable means in addition to the speed-responsive means for effecting operation of both of said mechanisms.

15. A variable pitch propeller having blades adjustable about their axes from a position of low pitch to a position of high pitch and further movable from one of such positions to full feathered position, two motor devices for adjusting the blades of the propeller and being operatively connected therewith, one of said devices turning the blades in the range between the said low and high pitch positions, the other of said devices turning the blades to the full feathered position, and speed-responsive means correlating the operation of the two motor devices.

16. A variable pitch propeller having blades adjustable about their axes from a position of low pitch to a position of high pitch and further movable from one of such positions to full feathered position, two motor devices for adjusting the blades of the propeller and being operatively connected therewith, one of said devices turning the blades in the range between the said low and high pitch positions, the other of said devices turning the blades to the full feathered position, and speed-responsive means correlating the operation of the two motor devices including a common fluid pressure system and separate speed-responsive governor-operated valves in the system, one for each motor.

17. A variable pitch propeller comprising a hub having blades thereon adjustable about their axes, said blades being adjustable from a low pitch position to a high pitch position and being further adjustable from one of said positions to a full feathered position, a movable element for operating the blades, a fluid pressure operated means within the hub for moving said element through a range to rotate the blades between the low and high pitch positions, and a second fluid pressure actuated device in the hub for operating said element to turn the blades to the full feathered position.

18. A variable pitch propeller having blades adjustable about their axes, an operating element for actuating the blades, a system of two expansible chamber motors for independently moving said operating element, one through the full range of its movement and the other through a limited range only, there being a lost motion connection between the latter and the operating element, and a fluid pressure system for operating said expansible chamber motors.

19. A variable pitch propeller having blades adjustable about their axes, an operating element for actuating the blades, a system of two expansible chamber motors for independently moving said operating element, one through the full range of its movement and the other through a limited range only, there being a lost motion connection between the latter and the operating element, a common fluid pressure system for operating both of said expansible chamber motors, and means for controlling their operation according to the speed of the propeller.

20. A variable pitch propeller having blades adjustable about their axes, an operating element for actuating the blades, a system of two expansible chamber motors for independently moving said operating element, one through the full range of its movement and the other through a limited range only, there being a lost motion connection between the latter and the operating element, a common fluid pressure system for operating both of said expansible chamber motors, means for controlling their operation according to the speed of the propeller, and manually operable devices for effecting operation of said motors and rendering the speed-responsive means ineffective.

21. A variable pitch propeller comprising a hub having adjustable blades thereon movable between low pitch and high pitch positions and also movable to a full feathered position, means in the hub providing a fluid reservoir, means in the hub integral in part with said first means forming two concentric expansible chamber motors one of which has a longer stroke than the other, a nose member arranged to be operated by both of said expansible chamber motors, there being a lost motion connection between the motor having the shorter travel and the nose to allow for the wider range of movement of the nose under the action of the motor having the longer travel, a pump carried on the hub and operated through the rotation thereof for delivering fluid from the reservoir to the expansible chamber motors, speed-responsive valves for controlling the delivery of fluid from the pump to said respective motors, and means operatively connecting the adjustable blades with the nose.

22. A variable pitch propeller comprising a hub having adjustable blades thereon, said blades being adjustable from low pitch position to a high pitch position and being further adjustable to a full feathered position, said blades being of a character such that centrifugal force serves to normally move the blades to the low pitch position when the propeller is revolving, a fluid pressure motor for moving the blades from the low pitch position over a range of positions to the high pitch position, a second fluid pressure motor for moving the blades to a full feathered position, means for supplying fluid pressure to said motors, and governor-controlled valves for controlling the escape of fluid from said motors, said fluid pressure motors being arranged to operate in opposition to the centrifugal action which turns the blades to low pitch position.

23. A variable pitch propeller comprising a hub having blades thereon which are axially adjustable and movable from a low pitch position to a high pitch position and also movable to a full feathered position, means carried by the hub for controlling the adjustment of the blades in the range between the low pitch and high pitch positions, means dependent upon the speed of rotation of the propeller for automatically controlling said first means, manually operable means for effecting adjustment of the propeller independent of said speed-responsive means, and means for turning the blades from a position in the operating range to a full feathered position.

24. A variable pitch propeller comprising a hub having blades thereon which are axially adjustable and movable from a low pitch position to a high pitch position and also movable to a full feathered position, means carried by the hub for controlling the adjustment of the blades in the range between the low pitch and high pitch positions, means dependent upon the speed of rotation of the propeller for automatically controlling said first means, manually operable means for effecting adjustment of the propeller independent of said speed-responsive means, and manually operable means for effecting such full feathering operation.

25. A variable pitch propeller unit comprising a shaft, a hub fixed on the shaft, adjustable blades on the hub, a blade-actuating unit secured to the hub and shaft assembly at the forward end of the shaft, said unit comprising members constituting a concentric reservoir and expansible chamber fluid pressure motor, pump means in said unit operated directly and entirely through the rotation of the propeller for circulating fluid through the motor and reservoir, valve means in said unit for controlling such circulation, and speed-responsive means for controlling the valve.

26. A variable pitch propeller unit comprising a shaft, a hub fixed on the shaft, adjustable blades on the hub, a blade-actuating unit secured to the hub and shaft assembly at the forward end of the shaft, said unit comprising members constituting a concentric reservoir and expansible chamber fluid pressure motor, pump means in said unit driven entirely through the rotation of the propeller for circulating fluid through the motor and reservoir, valve means in said unit for controlling such circulation, speed-responsive means for controlling the valve, and manually adjustable means for independently actuating the valve.

27. An attachment for operating the blades of an adjustable pitch propeller, comprising a member adapted to be secured to the forward end of a propeller shaft in advance of the hub of the propeller, said member supporting a reservoir, an expansible chamber fluid pressure motor, said member also carrying a pump driven entirely by the rotation of the adjustable pitch propeller and valves for circulating fluid through the reservoir and motor, and means for transmitting motion from the motor to the adjustable blades of the propeller to which the unit is attached.

28. The combination with a variable pitch propeller having angularly adjustable blades movable from a position of low pitch angle through a position of high pitch angle to a full feathered position, a motor system comprising motor means and speed-responsive means driven by the propeller for operating the blades from a high pitch angle to a low pitch angle on slowing down of the propeller within a given range and automatically operable upon slowing of the propeller below such range to move the blades from the low pitch angle through a position of high pitch angle to the full feathered position.

29. A variable pitch propeller having blades adjustable from a low pitch position to a high pitch position and also adjustable to a full feathered position, fluid actuating means responsive to the speed of the propeller for adjusting the blades in the range between the low pitch and the high pitch positions, manually operable means for controlling said actuating means to selectively adjust the blades in the range between the low and the high pitch positions, a second actuating means for full feathering the propeller, a common movable member to which each of said actuating means directly transmits its motion, said member being spaced from the blades, and operating connections between said common movable member and the propeller blades.

30. A variable pitch propeller having blades adjustable from a low pitch position to a high pitch position and also adjustable to a full feathered position, actuating means responsive to the speed of the propeller for adjusting the blades in the range between the low pitch and the high pitch positions, manually operable means for controlling the said actuating means to selectively determine the position of the blades in the range between the low and the high pitch position, a second actuating means automatically responsive to a predetermined abnormally low speed of the propeller for moving the blades to a full feathered position, and common connections for transmitting motion from both of said actuating means to the propeller blades.

31. A propeller for airplanes comprising a hub, blades on the hub movable on the hub through a varying range of pitch angles, a propeller mounting with respect to which the hub rotates, a pump within the hub, cooperating means on the hub and mounting for positively driving the pump upon rotation of the propeller, a fluid reservoir within the hub, a fluid pressure motor means within the hub to which the pump supplies fluid, a distributing valve in the hub for controlling the flow of fluid from the pump through the motor, speed-responsive means within the hub for operating the distributing valve and means for transmitting motion from the motor means to the propeller blades to vary the pitch angle thereof.

32. The combination with a variable pitch propeller having angularly adjustable blades, of servo-motor means for moving the blades in a constantly increasing pitch angle to a full feathered postion, and speed-responsive means independent of the blades automatically operable upon the slowing down of the propeller to a predetermined abnormally low speed for controlling the operation of said first means.

ARTHUR G. RINDFLEISCH.